United States Patent [19]

Cotita

[11] Patent Number: 5,087,220
[45] Date of Patent: Feb. 11, 1992

[54] ANIMAL DEFENSIVE BARRIER AND EXERCISE DEVICE

[76] Inventor: Robert S. Cotita, 2034 Tomlinson Rd., Pensacola, Fla. 32526

[21] Appl. No.: 618,916

[22] Filed: Nov. 28, 1990

[51] Int. Cl.⁵ .................. A63H 1/06; A63H 33/30; A01K 29/00; A63B 59/00
[52] U.S. Cl. ........................... 446/247; 446/215; 446/473; 231/2.1; 273/84 R; 119/96; 2/338
[58] Field of Search ............. 446/213, 214, 215, 236, 446/247, 248, 252, 253, 265, 266, 404, 405, 473, 486, 490; 231/2.1, 3, 4, 6; 273/84 R; 2/16 X, 17, 338; 119/96, 136, 137, 138, 143

[56] References Cited

U.S. PATENT DOCUMENTS

| | | | |
|---|---|---|---|
| 1,800,778 | 4/1931 | Carson | 446/215 |
| 1,818,301 | 8/1931 | Canaday | 446/247 X |
| 2,044,240 | 6/1936 | Daniels | 446/247 |
| 2,839,242 | 6/1958 | Meistrell | 231/2.1 |
| 3,010,249 | 11/1961 | Sirks | 446/215 |
| 3,316,671 | 5/1967 | King | 446/215 |
| 4,033,069 | 7/1977 | Arzola | 446/215 |
| 4,460,174 | 7/1984 | Perry | 273/84 R |
| 4,601,474 | 7/1986 | Lew et al. | 273/84 R X |
| 4,784,391 | 11/1988 | Herron | 446/490 X |

FOREIGN PATENT DOCUMENTS 293339 7/1928 United Kingdom ............ 273/84 R

Primary Examiner—David N. Muir
Attorney, Agent, or Firm—John K. Donaghy

[57] ABSTRACT

An animal defensive barrier device comprising a hand-grip portion having end caps; a strap connected to the hand-grip through one of the end caps; a loop portion distal at one end of the hand-grip and a loop portion distal from the first loop end; a plurality of knots between the hand-grip and the distal loop portion; and a plurality of sleeves on the strap between the hand-grip portion and the distal loop portion.

5 Claims, 3 Drawing Sheets

ANIMAL DEFENSIVE BARRIER AND EXERCISE DEVICE

BACKGROUND OF THE INVENTION:

1. Field of the Invention

This invention pertains to self-defense devices for use by joggers, walkers, bicyclists, etc. for protection against attacks from uncontrolled animals as well as an exercise device when not in use as a defensive device.

2. Background of the Prior Art

The prior art comprises canes, sticks, ropes, etc. used to strike at attacking animals.

There are toy devices which resemble this invention but could not be used as self-defense devices as in this invention. Representative of these toy devices are the patents listed below and copies are attached for the record:

| Arzola | 4,033,069 | Melody Bird Instrument |
| King | 3,316,671 | Whirling Sound-Making Toy |
| Steiner | 3,046,692 | Whirling Toy |
| Carson | 1,800,778 | Toy |
| Hawk | 157,095 | Toys |

U.S. Pat. No. 4,033,069 is a device for simulating melodious sounds of tropical birds.

U.S. Pat. No. 3,316,671 is a whirling sound-making toy device.

U.S. Pat. No. 3,046,692 describes a whirling whistle toy as does U.S. Pat. Nos. 1,800,778 and 157,095.

SUMMARY OF THE INVENTION

Animal attacks are a constant concern of joggers, walkers and bicyclists.

In the past these body fitness enthusiasts have resorted to carrying canes, sticks, etc. to use against attacking animals. Those devices are cumbersome to carry and can excite an animal to be more challenging and cause an attack.

There is, therefore, a need for a simple, light-weight yet sturdy device which, when used properly, will be effective in warding-off an attack by a challenging animal.

It is one object of this invention to provide a simple light-weight, hand-held device which is easy to use and inexpensive to manufacture.

Another object of this invention is to provide a hand-held self-defense device which assists the user in exercising yet is ready to use instantly in the event of an animal attack.

And another object of this invention is to provide joggers, walkers and bicyclists with a hand-held device which when activated will emit a warning sound that will repel an animal attack.

Yet another object of this invention is to provide a device which has an inherent psychological grip which instills confidence and strengthens the user's desire to exercise vigorously.

It is a further object of this invention to provide the user with the means for creating a visual defensive barrier which will deter an animal attack.

This invention thus eliminates the use of cumbersome devices yet provides a useful article which enhances exercise yet will not cause serious injury to an animal when used to prevent an attack.

These and other objects of the invention will become apparent to those skilled in the art to which the invention pertains from a careful reading of the following specifications when viewed in light of the attached drawings.

Figure 1:
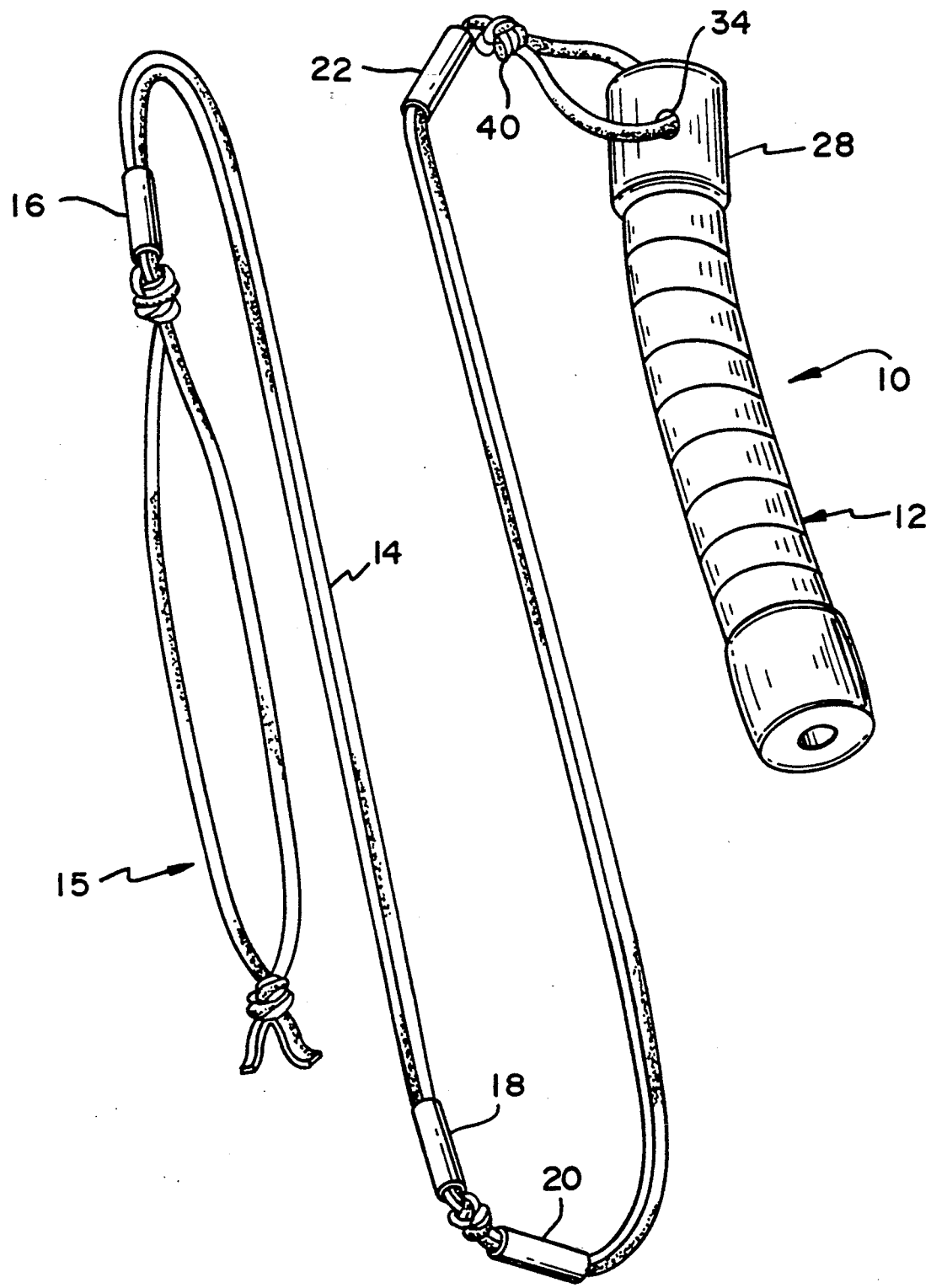
FIG. 1 is a perspective view of the invention showing a hand-held device with attached strap.

DETAILED DESCRIPTION OF THE PREFERRED EMBODIMENT OF THE INVENTION:

Referring now in more detail to the drawings, FIG. 1 shows a jogger's self-defense device 10 comprising a hand-grip 12 and an attached strap 14 having a looped end 15 with intermediate weights 16, 18, 20 and 22. The strap 14 comprises at least two lengths 15 and 17 of any durable material such as rawhide. This construction provides double strength which is preferable in the event the device must be used to strike an animal.

Figure 2:
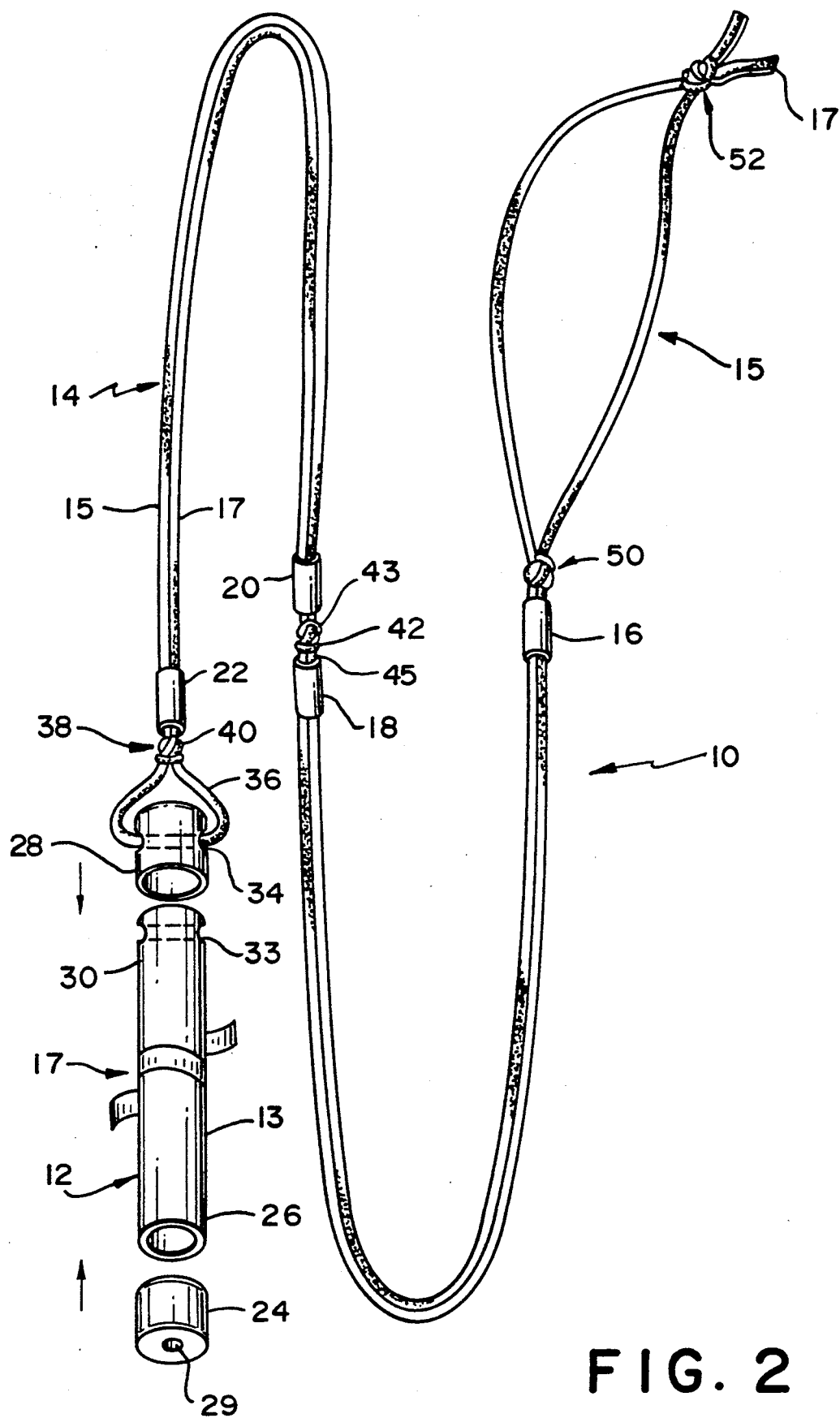
FIG. 2 is another perspective view of the invention showing the various elements in detail which comprise the invention.

The grip 12, FIG. 2, comprises a hollow cylinder handgrip 13 having a cap 24 at the distal end 26 and a cap 28 at the opposite end 30. The end 30 has a through horizontal bore 33 and the cap 28 has similar bore 34. It will be apparent that the cap 28 fits over the end 30 so that the bores 33-34 align with each other to provide a passage for an end 36 of the strap 14.

The end 36 of the strap 14 is passed through the bores 33 and 34 and is secured at 38 by a knot 40. Positioned on the strap 14 next to the knot 40 is a cylinder sleeve 22 which functions as a weight as well as a decorative element.

It will be seen that the strap 14 has a second knot 42 with cylinder sleeves 20 and 18 on either end 43-45. This knot 42 is approximately equidistant between the loop end 36 and the loop end 15. The looped end 15 comprises a knotted part 50 having a sleeve 16 adjacent thereto as shown. The other end 17 is knotted at 52. The loop 15 is placed around the wrist 60 of jogger 62.

The caps 24 and 28 of the grip 12 have holes 29 (one shown) to allow air to pass through the hollow cylinder 13. Between the caps 24 and 28 on the cylinder 13 is a band 17 of decorative tape. Additional bands of colored tape may be attached.

The sleeves may also be colored so as to give a pleasant visual effect to the device. The grip 12 may be constructed from a durable rubber, plastic, wood or the like. Caps 24 and 28 may be plastic and may be press-fitted over the ends of the grip 12.

Figure 3:
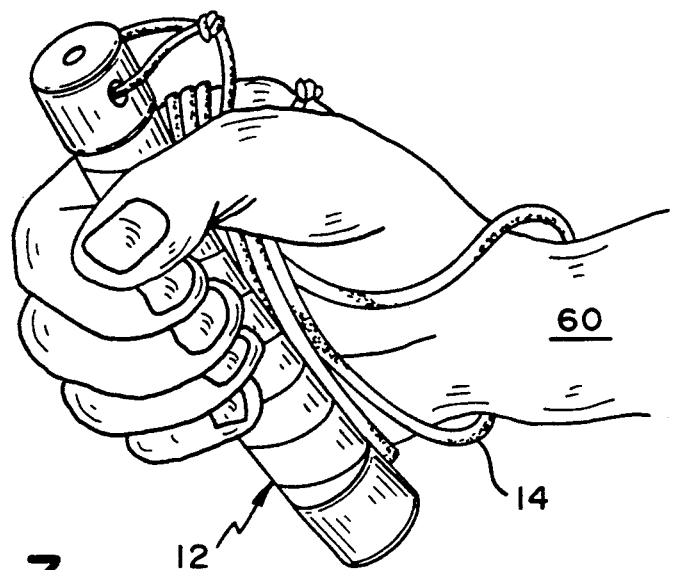
FIG. 3 shows the invention held in the hand of a user.
Figure 4:
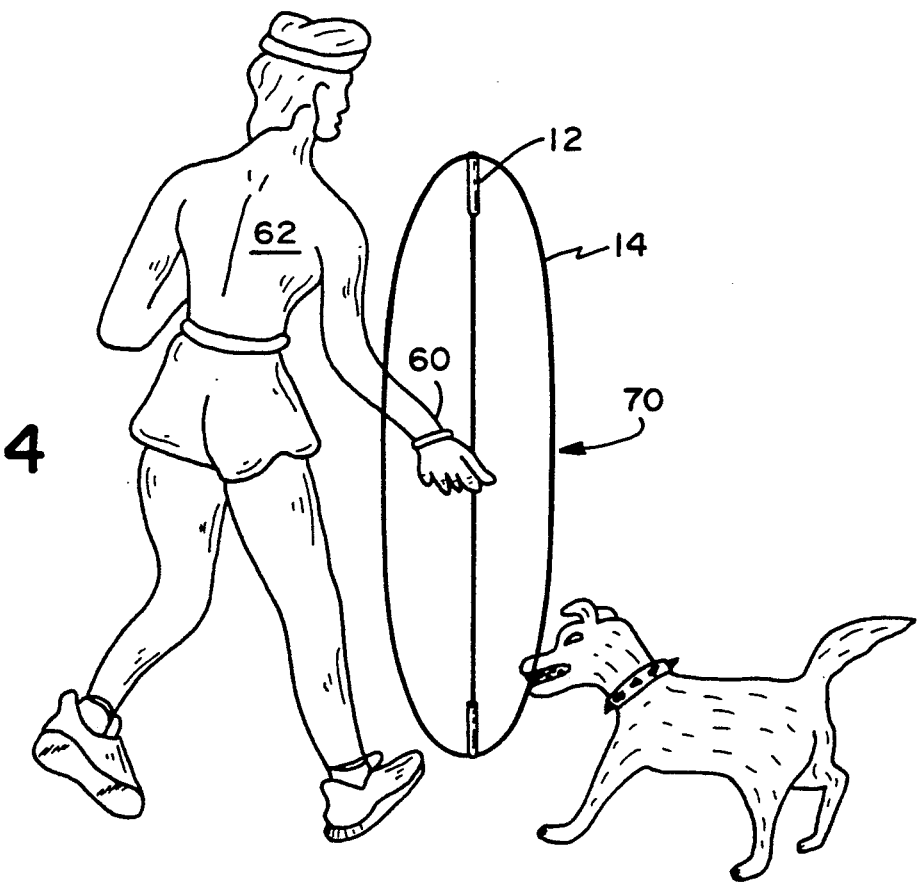
FIG. 4 shows the device in use to create a defensive barrier against an attacking animal.

In operation, a jogger places the loop 15 about the wrist, FIG. 3, and wraps the strap 14 about the hand as shown. The grip 12 is grasped firmly in the hand. In the event of an animal attack, FIG. 4, the jogger 62 merely drops the grip 12 and grasps the strap 14 near the knot 50 and sleeve 16 with the fingers and thumb. A rotational movement of the hand will cause the grip 12 to rotate whereby air passes through the device to cause a whistling sound.

The rotational movement of the device creates a self-defensive barrier 70 which, with the whistling sound, is effective to stop an attack. Should it become necessary to strike the animal, the combined weight of the strap, grip, knots and sleeves provides for sufficient force without permanently injuring the animal.

While the invention has been described with respect to a preferred embodiment thereof, it will be understood by those skilled in the art to which the invention pertains, that numerous changes may be made in the device without departing from the spirit and scope thereof.

What I claim is:

1. An animal defensive barrier and exercise device comprising:
    a hand-grip exercise portion having end caps;
    a double strap of rawhide connected to said hand-grip exerciser portion through one of said end caps;
    a loop portion for wrapping around a wrist of a user distal from said hand-grip exerciser portion;
    a plurality of knots joining said double strap between said hand-grip exercise portion and said distal loop portion;
    a plurality of sleeves on the double strap adjacent said knots between the hand-grip exercise portion and the loop portion; and
    means in the hand-grip exercise portion for creating a whistling noise when said device is rotated.

2. An animal defensive barrier and exercise device as defined in claim 1 wherein:
    said means in the hand-grip exercise portion is a hollow cylinder cooperating with bores in said end caps wherein an air passage is provided causing a whistling noise when the device is rotated.

3. An animal defensive barrier and exercise device as defined in claim 1 wherein:
    said hand-grip, knots, and sleeves are weights to provide a defensive barrier when rotated and an effective deterrent force on an attacking animal without causing serious injury to said animal.

4. An animal defensive barrier and exercise device as defined in claim 1 wherein:
    said hand-grip has at least one colored band intermediate its ends.

5. An animal defensive barrier and exercise device as defined in claim 1 wherein:
    said animal defensive barrier is created when said hand-grip is rotated thereby creating a barrier and whistling noise effective to prevent an attack from an animal.

* * * * *